Patented Aug. 26, 1930

1,773,788

UNITED STATES PATENT OFFICE

WILLIAM T. RAGLAND, OF RALEIGH, NORTH CAROLINA, ASSIGNOR TO ROBERT G. LASSITER & CO., OF RALEIGH, NORTH CAROLINA, A CORPORATION OF NORTH CAROLINA

METHOD OF PREPARING PAVING MATERIAL

No Drawing.   Application filed February 23, 1927.   Serial No. 170,429.

The present invention relates to a new and improved method of preparing paving material, and, as here described, will be disclosed as applied to bituminous paving materials, although it will be understood that by reference to paving materials, I intend to include any materials to which the method which I have invented is applicable. This application is a continuation in part of my copending United States application, Serial No. 78,700, filed December 31, 1925.

In the production of paving materials, it is customary to mix the aggregate with a suitable binder, which binder, in the case of bituminous mixtures, is any suitable mineral pitch. Obviously, binders other than mineral pitch could be used where the pavement was of a non-bituminous type. The aggregate may take a variety of forms, but, in the bitulithic pavement, is made up of mineral substances of different grades as to size, those commonly in use running from dust up to any appropriate size, as, for example, a one and one-half inch mesh. This aggregate is mixed in suitable proportions with the binder, and after a thorough intermixing, it is ready to be laid upon the foundation to form the roadway. Various methods of compounding and mixing the aggregate and the binder have been proposed and are now in use, but as the present method is not dependent on any specific manner of mixing, it is not necessary to describe in detail a particular method of mixing. Furthermore, since my method of preparing the mixture is independent of any specific apparatus, illustration or description of the apparatus is unnecessary.

In the preparation of these paving materials, it is important that an intimate relation be brought about between the aggregate and the binder, and the more completely the aggregate is coated and impregnated with the binder, the more stable will be the paving mixture, and a more stable and wear-resisting pavement can be produced. Failure to thoroughly coat and impregnate the aggregate with the binder will result in an uneven and faulty mixture, with portions of the aggregate which are not in intimate relation with the binder. When such faulty mixture is laid, the pavement is unsatisfactory, because of flaws, due to poorly coated aggregate, and disintegration, both under stress of traffic and under attacks of moisture, will rapidly develop bad spots in the laid material.

Various plans have been suggested for overcoming the difficulty and securing the desired intimate relation of binder and aggregate, one of which plans contemplates subjecting the batch or mass of aggregate and binder, while in process of mixing, to air pressure, greater than atmospheric pressure, while it was going through the mixer. The difficulty with this plan is that since the material is in a state of agitation, pressure is not effective on the moving particles; it is difficult to maintain an effective pressure in the mixer, and the period during which material is passing through the mixer is too short to give completely satisfactory results.

My method contemplates the application of pressure to a stable mass of the mixture under such conditions that the particles of coated and impregnated aggregate, while in a state of rest, will be subjected to a uniform and continued pressure for such period as will bring about the desired result, and by following the method, a paving composition is produced in which a very complete and intimate application of the binder to the aggregate is found, and the difficulties dependent upon poorly prepared and insufficiently agglomerated mixtures are overcome.

In practicing my process, the usual steps of preparing the aggregate will be followed. The aggregate of such material as is suitable for the pavement which is to be laid, is selected and graded into its sizes in the customary manner. It may be, and preferably is, thoroughly heated, to eliminate all moisture and to expand the particles so that they will be in a receptive condition for coating and impregnating with the binder. The aggregate thus prepared is then mixed with the binder, which, if a bituminous binder, is preferably hot. This mixing may be done in any suitable mixing machine of the pug mill type, or rotary cylinder type, whichever may be preferred. The mixing operation will continue until the aggregate has been thoroughly coated as to all of its particles with the binder, and this is the material which is now customarily taken and laid upon the roadway to form the pavement. In this condition, it gives reasonably good results, but I have discovered that its qualities, particularly its stability, can be materially improved by taking the batch from the mixer, depositing it, in a suitable mass, in a substantially airtight container, and subjecting it to a pressure greater than atmospheric pressure, for such length of time as may be necessary or desirable. Any type of container may be used, although, preferably, a container insulated against heat dissipation, so as to retain the batch at substantially the temperature at which it comes from the mixer, is used. Such container may be insulated by any of the approved heat insulating methods now in use. After the batch has been deposited in this container, I introduce air under pressure, and one or more air inlets may be used.

The effect of the air under pressure upon the mixed mass under the conditions above mentioned is to bring about a more even distribution of the bituminous binding agent over the surfaces of the mineral aggregate, the better impregnation of the cracks and crevices in the mineral aggregate with the binding agent, and impregnation of the interstitial spaces in the mixture, especially with reference to that portion of the mixture which consists of small particles of sand and finely divided mineral matter in the nature of dust. In other words, there is not only an impregnation of the mineral aggregate itself, but a forcing of the latter together so that the finer particles more nearly take their ideal position with reference to the larger. Moreover, due to the pressure, any small voids existing in the mass are rendered even smaller.

To obtain the most perfect result, I supply the container in which the mixture is deposited with a pressure gauge and initially introduce air into the container to a predetermined pressure. The result of the reaction described above is naturally a shrinkage in the mass and due to this shrinkage the predetermined pressure will correspondingly fall. After the pressure has fallen its maximum amount, I restore the original pressure and if the mass is allowed to stand this restored pressure will fall in view of the further shrinkage. Thus my process includes the steps of introducing a predetermined pressure and subsequently restoring this pressure as many times as necessary so that finally the original pressure will be retained. At this point it is evident that the ultimate degree of density has been obtained. Of course, with the variation of the binder or aggregate according to different conditions, different pressures will be used, the correct pressure being determined empirically. The use of a separate container for the application of pressure enables me to hold the mixture in its stable condition any length of time necessary to complete the process. This, of course, is a distinct advantage over applying pressure in the mixer, since the work would be considerably impeded if this apparatus were subjected to long periods of inactivity. As against the use of pressure in the mixing process, I obtain the advantages of density and thorough impregnation as described above. It is obvious that when the mass is mobile as in the mixing process, the actual impregnation will be slight and the thorough relative arrangement of the particles entirely impossible.

Another advantage of this method is that the material may be held in the insulated heat retaining container for a considerable period of time, and yet will be in condition for use. Under ordinary methods, the material must be taken directly from the mixer and laid on the job, with no provision for maintaining a supply, which may be drawn upon for a considerable period after it has been placed in the insulated container.

Furthermore, by my method of storing, the material, after it has been mixed and subjected to pressure, may be tested, and if found necessary, can again be returned to the mixer for further treatment or correction as to its makeup.

This intermediate step of storing and treating, as distinguished from taking directely from the mixer and laying on the job, has, therefore, the advantage, not only of securing a more complete impregnation of the aggregate by the binder, but also has the practical advantages of readily permitting tests before using the batch, and of establishing a base or supply, which may be drawn upon for a very considerable period after the mixture has been made and stored.

I claim:

1. The method of preparing paving material and the like, which consists in mixing aggregate and binder in the presence of heat, transferring and storing the mixed mass in quiescent insulated condition, and subjecting it to a fluid pressure greater than atmospheric pressure.

2. The method of treating paving material and the like, which consists in subjecting a quiescent mass of mixed aggregate and binder to measured fluid pressure greater than atmospheric pressure, and restoring such pressure upon its fall due to shrinkage of the mass.

3. The method of treating paving material and the like, which consists in subjecting a stable mass of mixed aggregate and binder to measured fluid pressure greater than atmosperic pressure, and repeatedly restoring such pressure upon its fall due to shrinkage of the mass until it remains constant.

4. The method of treating paving material and the like, which consists in subjecting a stable mass of mixed aggregate and binder to a predetermined fluid pressure greater than atmospheric pressure, permitting a maximum loss of pressure due to shrinkage of the mass, and restoring the original pressure.

5. The method of treating paving material and the like, which consists in subjecting a stable mass of mixed aggregate and binder to a predetermined fluid pressure greater than atmospheric pressure, permitting a maximum loss of pressure due to shrinkage of the mass, restoring the original pressure, and repeating the treatment until the original pressure is retained.

6. The method of preparing paving material which consists in mixing aggregate with a suitable binder in the presence of heat, depositing the treated mixture in a stable insulated mass, and subjecting the mass to a fluid pressure greater than atmospheric pressure.

7. The method of preparing paving material and the like, which consists in mixing aggregate and a suitable binder, depositing the mixture in a quiescent mass, subjecting the mass to measured fluid pressure greater than atmospheric pressure and restoring such pressure upon its fall due to shrinkage of the mass.

8. The method of preparing paving material and the like which consists in mixing aggregate and a suitable binder, depositing the mixture in a quiescent mass, subjecting the mass to measured fluid pressure greater than atmospheric pressure, and repeatedly restoring such pressure upon its fall due to shrinkage of the mass until it remains constant.

9. The method of preparing paving material and the like which consists in mixing aggregate and a suitable binder, depositing the mixture in a quiescent mass, subjecting the mass to a predetermined fluid pressure greater than atmospheric pressure, permitting a maximum loss of pressure due to shrinkage of the mass, and restoring the original pressure.

10. The method of preparing paving material and the like which consists in mixing aggregate and a suitable binder, depositing the mixture in a stable mass, subjecting the mass to a predetermined fluid pressure greater than atmospheric pressure, permitting the maximum loss of pressure due to shrinkage of the mass, restoring the original pressure, and repeating the pressure application until the original pressure is retained.

In testimony whereof I have hereunto set my hand.

WILLIAM T. RAGLAND.